No. 770,343. PATENTED SEPT. 20, 1904.
C. B. WEBSTER.
ATTACHMENT FOR PLANTERS.
APPLICATION FILED APR. 9, 1902.
NO MODEL.
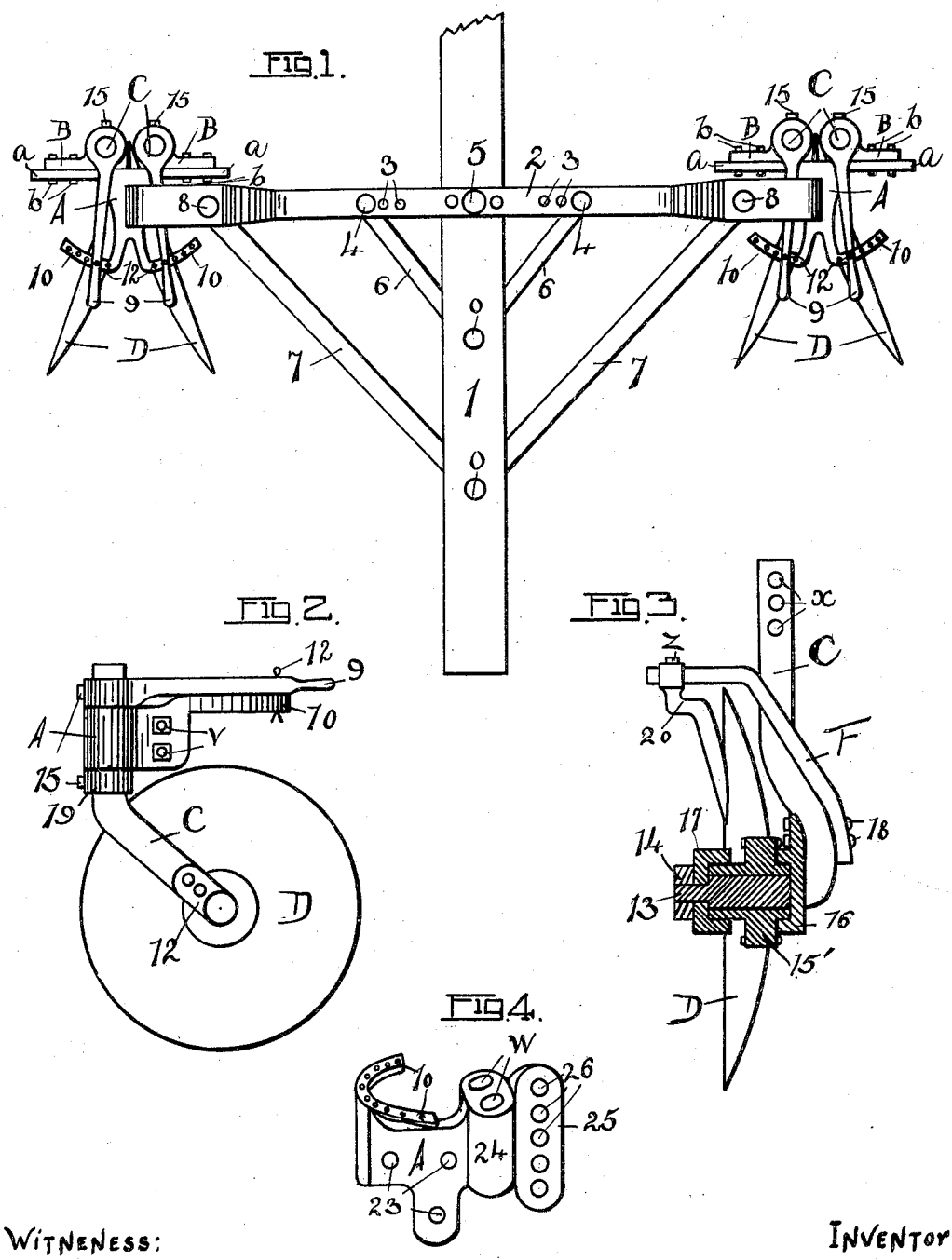
WITNESS:
F. J. Larson.
O. A. Sprecher.
INVENTOR:
Charles B. Webster.
PER: Geo. W. Suess
ATTY.

No. 770,343.  Patented September 20, 1904.

UNITED STATES PATENT OFFICE.

CHARLES B. WEBSTER, OF NEWKIRK, OKLAHOMA TERRITORY.

ATTACHMENT FOR PLANTERS.

SPECIFICATION forming part of Letters Patent No. 770,343, dated September 20, 1904.

Application filed April 9, 1902. Serial No. 102,105. (No model.)

*To all whom it may concern:*

Be it known that I, CHARLES B. WEBSTER, residing at Newkirk, in the county of Kay and Territory of Oklahoma, have invented certain useful Improvements in Attachments for Planters; and I do hereby declare that the following is a full, clear, and exact description of the invention, such as will enable others skilled in the art to which it appertains to make and use the same, reference being had to the accompanying drawings, which form a part of this specification.

This invention relates to a new and novel attachment for planters.

The object of my invention is to provide an attachment to said drills adapted to make a furrow intended to receive the seeds, so that the seed may be deposited upon a loose bed of earth. This same furrow-creating mechanism at the same time also destroys any weeds or other vegetation that may have grown within the path of the furrow.

In the accompanying drawings I have shown in Figure 1 a top view of a broken portion of a seeder provided with my improvement. Fig. 2 shows an enlarged detail of one of the furrow-making disks as used in my invention. Fig. 3 shows a central sectional view of a modification of the union employed in supporting one of the disks, while Fig. 4 shows a modification of a supporting-hub.

In the accompanying drawings I have shown a tongue or pole 1. Secured to this tongue is a cross-bar 2, this bar being provided with a number of openings 3 3, so that a bolt 4 may be given suitable adjustment. Centrally I provide a bolt 5, by means of which the cross-bar 2 is secured to the tongue 1. This cross-bar is further strengthened by stay-rods 6 6 and 7 7, secured by the bolts O, 4, and 8.

Secured to the ends of the cross-bar 2, which ends extend downward, are the holders A A. These holders are fixed to the cross-bar 2 by suitable means and are provided with the laterly-extending portions *a a*, as is shown in Fig. 1. Near the farther ends and extending in opposite directions are the perforated brackets 10, as is shown more clearly in Fig. 1.

Secured to the lateral extensions *a* of the holder A are the bearings B, secured by suitable bolts, within which bearings are held the crooked shafts C, which shafts at their trailing ends support the disks D. These crooked shafts C are secured to the adjusting-handles 9, which handles are provided with a cotter-pin 12, as is shown in Fig. 2, for instance, and these pins 12 are forced through the perforations within the handles 9, so that these adjusting-handles 9 may be locked in any desired position to provide a wide or narrow furrow, as may be understood in referring to Fig. 1. By means of set-screws 15 these handles 9 are adjustably secured to the crooked shafts C.

In Fig. 2 I have shown a vertical elevation of one of the holders A, showing one of the crooked shafts C, which below is provided with a bearing 12, by means of which the disk D is revolubly secured to the crooked shaft C.

In Fig. 3 I have shown a modification in which I provide a bent shaft C, which is made to extend, as is shown at 13, to provide a bearing adapted to receive a boxing 15', the caps 16 and 17 forming a sand-tight box. Secured to this crooked shaft C is a bracket F, secured by means of the pin 18, which holds the scraping-knife 20, as disclosed.

In Fig. 4 I have shown a modification of the holder A, which is provided with the openings 23, the perforated brackets 10, the hub 24, and two openings W, through which the two crooked shafts C are to extend, while in front is provided the vertical clevis member 25, provided with the openings 26, as shown.

This device is exceedingly simple of construction and can be used in connection with any ordinary planter or seeder.

Having thus described my said invention, what I claim as new, and desire to secure by United States Letters Patent, is—

The combination with a tongue, of a cross-bar, holders secured to each end of said cross-bar, each holder being provided with a laterally-extending portion, perforated brackets extending laterally outward from each holder, bearings secured to said extending portion, bent shafts held within said bearings, disks secured to the trailing ends of said bent shafts, adjusting-handles extending from said bent shafts, said handles being adjustably secured to said perforated brackets, a bracket secured to back of said bent shafts, and a scraping-knife secured to each bracket, as and for the purpose set forth.

CHARLES B. WEBSTER.

In presence of—
 Wm. Prosser,
 D. C. Owens.